T. C. WATERS.
FLOWERPOT OR BOUQUET HOLDER.
APPLICATION FILED JULY 20, 1921.
1,421,327.
Patented June 27, 1922.
2 SHEETS—SHEET 2.
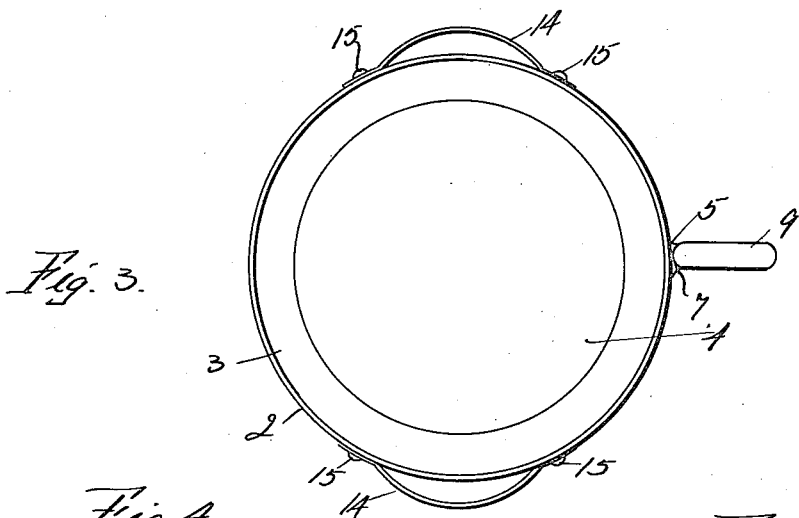
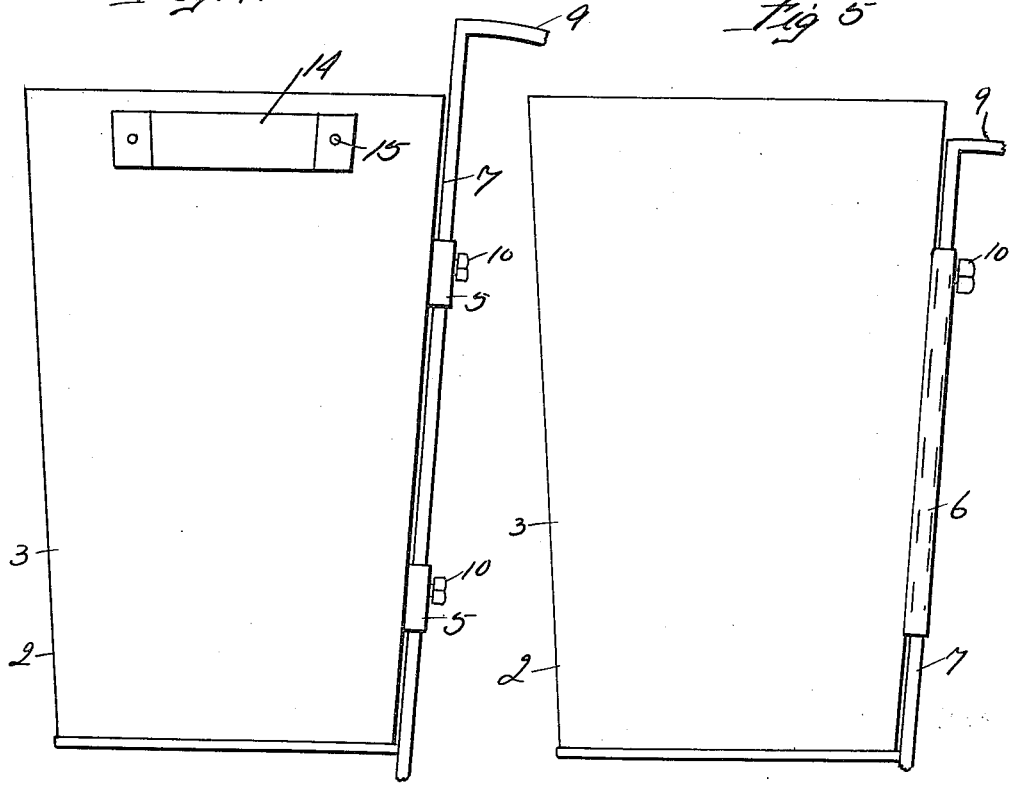
INVENTOR
Thomas C. Waters
By W. W. Williamson Atty.

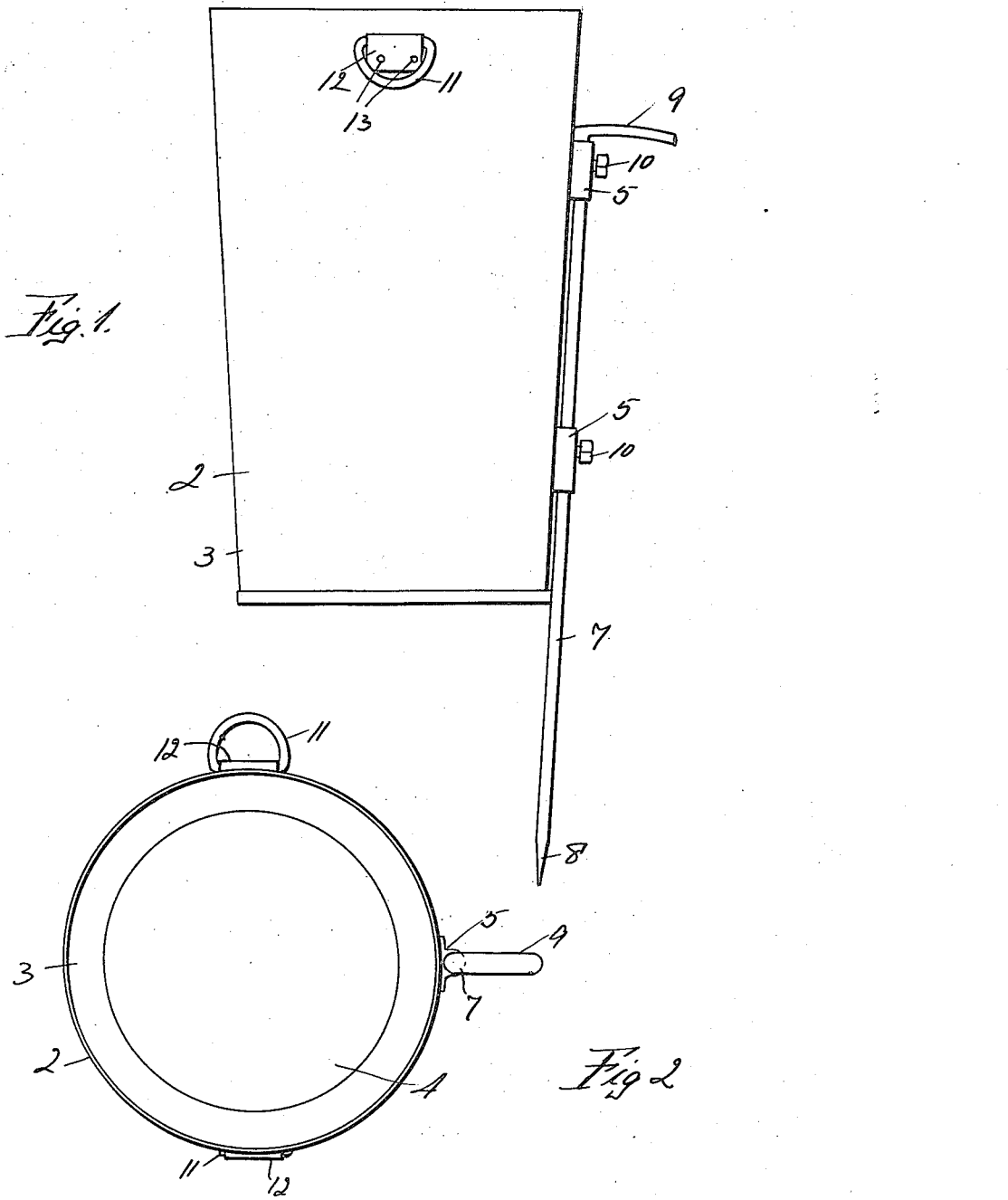

UNITED STATES PATENT OFFICE.

THOMAS C. WATERS, OF SHENANDOAH, PENNSYLVANIA.

FLOWERPOT OR BOUQUET HOLDER.

1,421,327.          Specification of Letters Patent.   Patented June 27, 1922.

Application filed July 20, 1921. Serial No. 486,253.

*To all whom it may concern:*

Be it known that I, THOMAS C. WATERS, a citizen of the United States, residing at Shenandoah, in the county of Schuylkill and State of Pennsylvania, have invented new and useful Improvements in a Flowerpot or Bouquet Holder, of which the following is a specification.

My invention relates to new and useful improvements in a flower pot or bouquet holder, and has for its object to provide an exceedingly simple and effective device of this character which will be relatively inexpensive in the cost of manufacture although strong and durable and which when placed upon the ground can be so held that it will not accidentally upset nor be blown over.

Another object of the invention is to provide a receptacle of any suitable or desirable size and shape or design constructed of suitable material preferably sheet metal and having means such as sockets for the reception of a rod, the latter being slidably mounted in said sockets and adapted to be inserted in the ground, said rod having a handle at one end more or less hook shaped to provide a hand hold so that the rod may be inserted in the ground by pressure, said handle also acting as a hanger when so desired.

Another object of the invention is to provide in combination with the elements above mentioned suitable receptacle handles for lifting and transporting the receptacle from place to place.

A further object of the invention is to provide means for holding the rod in any suitable adjusted position.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side elevation of a flower pot or bouquet holder constructed in accordance with my invention and showing the rod in its approximate position relative to the receptacle when the former is inserted in the ground.

Fig. 2, is a plan view thereof.

Fig. 3, is a similar view illustrating a slightly different formation of receptacle handle.

Fig. 4, is a side elevation thereof showing the rod in an elevated position and in such position it can be utilized as a hanger.

Fig. 5, is a similar view illustrating a different formation of socket and showing the use thereof without means for holding the rod in different adjusted positions.

In carrying out my invention as here embodied, 2 represents a receptacle which may be made of any suitable material such as potters clay, glass, cast or sheet metal or any desirable material, but for convenience of illustration I have here shown it as formed from sheet metal and this receptacle may also be of any suitable size and configuration although preferably it is of inverted frusto-conical form or has upwardly flaring side walls 3 closed at its lower end by the bottom wall 4, the upper end being open for the insertion of objects to be supported such as flowers.

On the exterior face of the side wall are located suitable sockets 5 which may be two or more in number as shown in Figs. 1 to 4 or a single long socket 5 may be utilized as shown in Fig. 5, said sockets either being formed as an integral part of the receptacle or attached thereto in some suitable manner as for instance they may be soldered or riveted in place.

A rod 7 is slidably mounted in the socket 5 or the single socket 6 and this rod is of sufficent length to permit its lower end to extend considerably below the bottom of the receptacle so that when said receptacle is resting upon the ground said rod can be inserted in the ground which will prevent the receptacle from becoming accidentally upset and in order that said rod may be readily forced into the ground by pressure of the hand combined with the weight of the body of a person placing the receptacle in position, I sharpen or point the lower end of the rod as designated by the numeral 8 and formed on the upper end thereof is a handle 9 which is preferably an integral part of the rod and is arranged at right angles to the main portion or body thereof, said handle being more or less hook shaped so that it may be utilized as a hanger or support to hang the receptacle from some object and when so used the rod is held in any suitable adjusted position by means of set screws 10 threaded through one or both of the lugs 5 or the lug 6, the inner ends thereof impinging against the shank or body of the rod. It is to be understood that where the rod is never to be used as a hanger the set screws 10 are eliminated.

If found desirable receptacle handles may be carried by the upper end of the receptacle, as shown in Figs. 1 to 4 inclusive or they may be dispensed with as shown in Fig. 5, and as these handles may be of any desirable or well known construction two differently constructed forms being herein illustrated. In Figs. 1 and 2, I have shown a receptacle handle consisting of a wire bale 11 journalled in a metal clip 12 which latter is fixed to the receptacle by some suitable means, the attaching means here shown being represented as rivets 13, while in Figs. 3 and 4 I have shown a handle 14 formed from a strip of metal bowed outwardly or arcuate in shape with the ends suitably fastened to the receptacle as by rivets 15.

In practice when the device is to be used on the ground the receptacle is set in the desired position and then by resting the hand upon the handle 9 of the rod and pressing thereon the rod will be forced into the ground and thus hold the receptacle in an upright position and prevent the same from being accidentally upset and the same will not be blown over by the wind unless of extraordinary velocity but when the receptacle is to be hung from some object such as for instance a porch railing said screws 10 are utilized and when the proper adjusted position for the rod is attained said screws are firmly set up against said rod after which the devices hung up by means of the rod handle 9 as will be obvious.

Of course I do not wish to be limited to the exact details of construction and combination of elements as herein shown as these may be varied within the limits of the appended claims without departing from the spirit of my invention.

Having thus fully described my invention, what I claim as new and useful is:—

1. A flower holder consisting of a receptacle, a pair of spaced sockets in vertical alignment on the exterior of said receptacle, a rod slidably mounted in said sockets, an integral handle formed with the upper end of said rod to be used for forcing said rod in the ground or as means to hang the device over an object, and means to hold said rod in different adjusted positions.

2. A flower holder consisting of a receptacle, a pair of spaced sockets in vertical alignment in the exterior of said receptacle, a rod slidably mounted in said sockets, an integral handle formed with the upper end of said rod to be used for forcing said rod in the ground or as means to hang the device over an object, set screws having threaded engagement with said sockets and adapted to impinge against the rod to hold the same in different adjusted positions and handles carried by the receptacle located adjacent its upper end on the exterior thereof.

In testimony whereof, I have hereunto affixed my signature.

THOMAS C. WATERS.